(12) United States Patent
Hirokane et al.

(10) Patent No.: US 11,248,562 B2
(45) Date of Patent: Feb. 15, 2022

(54) JET ENGINE, FLYING OBJECT, AND OPERATION METHOD OF JET ENGINE

(71) Applicant: MITSUBISHI HEAVY INDUSTRIES, LTD., Tokyo (JP)

(72) Inventors: Mariko Hirokane, Tokyo (JP); Keisuke Ando, Tokyo (JP); Yoshihiko Ueno, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 232 days.

(21) Appl. No.: 16/071,980

(22) PCT Filed: Jun. 22, 2016

(86) PCT No.: PCT/JP2016/068484
§ 371 (c)(1),
(2) Date: Jul. 23, 2018

(87) PCT Pub. No.: WO2017/158857
PCT Pub. Date: Sep. 21, 2017

(65) Prior Publication Data
US 2019/0032602 A1   Jan. 31, 2019

(30) Foreign Application Priority Data

Mar. 16, 2016   (JP) .............................. JP2016-052186

(51) Int. Cl.
*F02K 7/10*    (2006.01)
*F02C 7/00*    (2006.01)
(Continued)

(52) U.S. Cl.
CPC .................. *F02K 7/10* (2013.01); *F02C 7/00* (2013.01); *F02C 7/057* (2013.01); *F02C 7/26* (2013.01);
(Continued)

(58) Field of Classification Search
CPC .... F23R 3/002; F23R 3/10; F23R 3/12; F23R 3/22; F23R 3/24; F23R 3/26; F23R 3/28;
(Continued)

(56) References Cited

U.S. PATENT DOCUMENTS

| 2,908,136 A | 10/1959 | Arnoldi |
| 2,936,585 A | 5/1960 | Worsham et al. |

(Continued)

FOREIGN PATENT DOCUMENTS

| JP | 2-112656 | 4/1990 |
| JP | 2002-79996 | 3/2002 |

(Continued)

OTHER PUBLICATIONS

Extended European Search Report dated Nov. 15, 2018 in corresponding European Patent Application No. 16894475.9.
(Continued)

*Primary Examiner* — Todd E Manahan
*Assistant Examiner* — David P. Olynick
(74) *Attorney, Agent, or Firm* — Wenderoth, Lind & Ponack, L.L.P.

(57) ABSTRACT

A jet engine has an inlet 11 configured to introduce air, and a combustor 12 having a fuel injection port 30a that injects a fuel, and configured to combust the fuel injected from the fuel injection port 30a by using the air. The combustor 12 has a separation section 14 defining the air passage FA through which the air flows, between a rear end 15 of the inlet and the fuel injection port 30a. A plurality of turbulent flow generating sections (20;25) are arranged in the separation section 14 to makes the air flow turbulent. Each of the plurality of turbulent flow generating sections (20;25) contains a member (21;22;25B) which can restrain the turbulence of the air flow by moving or disappearing. It can be (Continued)

prevented that a high-pressure region reaches the inlet so that the thrust of the jet engine is reduced.

8 Claims, 11 Drawing Sheets

(51) Int. Cl.
| | | |
|---|---|---|
| *F02C 7/26* | (2006.01) | |
| *F23R 3/22* | (2006.01) | |
| *F23R 3/20* | (2006.01) | |
| *F02C 7/057* | (2006.01) | |
| *F23R 3/10* | (2006.01) | |
| *F23R 3/28* | (2006.01) | |

(52) U.S. Cl.
CPC ............... *F23R 3/10* (2013.01); *F23R 3/20* (2013.01); *F23R 3/22* (2013.01); *F23R 3/28* (2013.01); *F05D 2210/33* (2013.01); *F05D 2220/10* (2013.01); *F05D 2240/35* (2013.01); *F05D 2250/51* (2013.01); *F05D 2270/3061* (2013.01); *F23R 2900/00015* (2013.01)

(58) Field of Classification Search
CPC ............ F05D 2250/90; F05D 2240/35; F05D 2240/127; F05D 2220/10; F02C 9/44; F02K 9/78; F02K 7/10; F02K 7/14; F02K 7/16; F02K 7/18; B64C 23/06
See application file for complete search history.

(56) References Cited

U.S. PATENT DOCUMENTS

| | | | | |
|---|---|---|---|---|
| 4,291,533 | A * | 9/1981 | Dugger | ............... F02C 7/042 102/374 |
| 5,096,374 | A * | 3/1992 | Sakai | ............... F01D 17/162 384/206 |
| 6,427,948 | B1 * | 8/2002 | Campbell | ............... B64C 23/06 244/204.1 |
| 6,484,971 | B2 | 11/2002 | Layukallo | |
| 7,878,457 | B2 * | 2/2011 | Narramore | ............... B64C 23/06 244/200.1 |
| 9,789,956 | B2 * | 10/2017 | Bordoley | ............... B64C 13/02 |
| 2002/0079405 | A1 | 6/2002 | Layukallo | |
| 2004/0129838 | A1 * | 7/2004 | Lisy | ............... B64C 23/06 244/204.1 |
| 2008/0283677 | A1 * | 11/2008 | Pederson | ............... B64C 30/00 244/73 R |
| 2009/0297995 | A1 * | 12/2009 | Kennedy | ............... F02K 7/10 431/9 |
| 2010/0089468 | A1 * | 4/2010 | Scott | ............... F01D 17/14 137/468 |
| 2016/0363318 | A1 | 12/2016 | Ueno et al. | |
| 2017/0030297 | A1 | 2/2017 | Ueno et al. | |
| 2017/0067637 | A1 | 3/2017 | Ueno et al. | |
| 2017/0137116 | A1 * | 5/2017 | Ireland | ............... F04D 29/324 |

FOREIGN PATENT DOCUMENTS

| | | |
|---|---|---|
| JP | 2012-41821 | 3/2012 |
| JP | 2014-122593 | 7/2014 |
| JP | 2015-183680 | 10/2015 |
| JP | 2015-190740 | 11/2015 |
| JP | 2015-197055 | 11/2015 |
| WO | 2015/146357 | 10/2015 |
| WO | 2015/146375 | 10/2015 |
| WO | 2015/151620 | 10/2015 |

OTHER PUBLICATIONS

International Preliminary Report on Patentability dated Sep. 27, 2018 in International (PCT) Application No. PCT/JP2016/068484.
International Search Report dated Aug. 9, 2016 in International (PCT) Application No. PCT/JP2016/068484.

* cited by examiner

JET ENGINE, FLYING OBJECT, AND OPERATION METHOD OF JET ENGINE

TECHNICAL FIELD

The present invention relates to a jet engine, a flying object and an operation method of jet engine.

BACKGROUND ART

As a jet engine of a fuselage flying faster than a sound velocity, a turbojet engine (containing a turbofan engine and so on), a ram jet engine, and a scram jet engine are known. These are jet engines that operate by introducing air. Especially, in the ram jet engine and the scram jet engine, the speed of the introduced air depends strongly on a flight speed.

FIG. 1A and FIG. 1B are cross-sectional views schematically showing the configuration of a jet engine. Here, FIG. 1A shows a case where the flight speed is slow, and FIG. 1B shows a case where the flight speed is fast. The jet engine 102 has a fuselage 110 and a cowl 140 provided below the fuselage 110 to form a space 150 through which gas can flow. A front lower part of the fuselage 110 and a front part of the cowl 140 configure an inlet 111 that introduces air into the space 150. A middle lower part of the fuselage 110 and a middle part of the cowl 140 configure a combustor 112 which mixes and combusts a fuel and the air. The rear lower part of the fuselage 110 and a rear part of the cowl 140 configure a nozzle 113 which expands and expels a combustion gas. The combustor 112 has a fuel injector 120 and a flame stabilizer 121. The fuel injector 120 is provided in the lower part of the fuselage 110 corresponding to the combustor 112. The fuel injector 120 injects a fuel G into the space 150. The flame stabilizer 121 is provided on a rear side than the fuel injector 120 in the lower part of the fuselage 110 corresponding to the combustor 112. The flame stabilizer 121 maintains a flame F for combustion by using the fuel G from the fuel injector 120. The jet engine 102 mixes and combusts the air introduced from the inlet 111 and the fuel G injected from the fuel injector 120 in the combustor 112, expands the combustion gas in the nozzle 113 to expel to a rear direction from the fuselage 110. The flame F of the flame stabilizer 121 is used for the maintenance of the combustion.

A high-pressure region HP is formed in front of the flame stabilizer 121 of the combustor 112. The size of high-pressure region HP is mainly determined based on a balance of the combustion pressure of combustion in the combustor 112 and the dynamic pressure of the air introduced from the inlet 111. In case (FIG. 1B) that the flight speed is fast (mainly, at a cruising step of the flying object) so that the dynamic pressure of air is high, the high-pressure region HP becomes narrow. On the other hand, in case (FIG. 1A) that the flight speed is slow (at an almost acceleration step of the flying object) so that the dynamic pressure of the air is low, the high-pressure region HP becomes wide.

Note that in the high-pressure region HP, the flow of air introduced from the inlet 111 delaminates from the wall surface of the combustor or is easy to delaminate from the wall surface of the combustor.

As the related techniques, Patent Literature 1 (JP 2002-79996A) discloses a method of restraining delamination of a flow in an aerodynamic surface and phenomenon relating to it. The restraining method shown in Patent Literature 1 has as an object, to restrain that a flow of fluid along an object is delaminated from the object surface. It is described in Patent Literature 1 that a barrier member is placed on the object surface. The barrier member is arranged in a delamination flow layer in the neighborhood of the object surface.

Also, Patent Literature 2 (JP 2012-41821A) discloses a wing body. Patent Literature 2 has as an object, to restrain delamination of a flow in a negative pressure surface of wing effectively by a minimum flow resistance. It is described in Patent Literature 2 that a plurality of notched step sections are provided in a front section of the negative pressure surface of wing and a plurality of prominences are provided on a rear side than the plurality of notched step sections.

CITATION LIST

Patent Literature

[Patent Literature 1] JP 2002-79996A
[Patent Literature 2] JP 2012-41821A

SUMMARY OF THE INVENTION

In case of flight speed being slow so that the high-pressure region HP extends to a front direction and reaches the inlet 111 (FIG. 1A), enough air is not supplied to the inside of the space 150 so that the decline of thrust of the jet engine 102 can occur.

Therefore, in order to cope with this situation, the following method is thought of. FIG. 2A and FIG. 2B are cross sectional views schematically showing the configuration of the jet engine to which the method is applied. However, the FIG. 2A shows a case that the flight speed is slow, and FIG. 2B shows a case that the flight speed is fast. In the jet engine 102a of these diagrams, a flame stabilizer 121a is installed on a downstream side, compared with the jet engine 102 shown in FIG. 1A and FIG. 1B. In other words, in the combustor 112a of the jet engine 102a, a front area from the flame stabilizer 121a is set to be a longer area. This is because the length of the front area is set long so that the high-pressure region HP does not reach the inlet ill, even when the flight speed is slow. At this time, to secure a combustion time in case that the flight speed is fast, the length in a rear direction from the flame stabilizer 121a is not changed and is maintained. That is, this method is a method in which the length in a front direction from the flame stabilizer 121a is made long so that the whole combustor 112a is extended in a length direction.

Thus, even when the flight speed is slow (FIG. 2A), there is no case that the high-pressure region HP reaches the inlet ill, and it is possible to prevent the decline of thrust of the jet engine 102a. However, supposing that the full length of the jet engine 102a is not changed, it would be necessary to make the length of nozzle 113 short for an increment of the length of the combustor 112a.

However, in such a case, the jet engine 102a can operate but it is difficult to acquire a thrust in an axle direction, and a problem that the net thrust declines occurs. Or, in case that the nozzle 113 is made long or large sufficiently to obtain a thrust in the axle direction, the problem that the fuselages 110a must be upsized occurs.

Therefore, an object of the present invention is to provide a jet engine in which it can be prevented without remodeling a fuselage largely that a high-pressure region reaches an inlet so that a thrust of the jet engine declines, a flying object and an operation method of the jet engine.

The object of this invention, other objects and profits except it could be easily confirmed from the following description and the attached drawings.

The jet engine in some embodiments includes: an inlet configured to introduce air; and a combustor having a fuel injection port from which a fuel is injected and configured to combust the fuel injected from the fuel injection port by using the air. The combustor has a separation section defining an air passage through which the air flows, between a rear end of the inlet and the fuel injection port. A plurality of turbulent flow generating sections are arranged in the separation section to make an air flow turbulent. Each of the plurality of turbulent flow generating sections contains a member that can restrain the turbulence of the air flow by moving or disappearing.

In the above jet engine, the member may contain a prominence which is prominent for the air passage.

In the above jet engine, the member may contain a material that disappears from a wall surface of the separation section by a thermal influence or an aerodynamic influence in flight.

In the above jet engine, a position of the member on the wall surface of the separation section does not overlap a position of the fuel injection port, viewing in a direction of the air flow through the air passage.

In the above jet engine, the combustor may have a first wall surface where the fuel injection port has been arranged and a second wall surface where the plurality of turbulent flow generating sections have been arranged. The second wall surface may be a wall surface that is different from the first wall surface.

In the above jet engine, the member may be a movable member to the air passage.

In the above jet engine, the movable member may be configured to move automatically by the thermal influence or the aerodynamic influence in flight.

The above jet engine may further include a drive device which moves the movable member and a control device which controls a drive device. The control device may drive the drive device to operate based on at least one of a flight Mach number, a flight height and a flight time. The drive device may operate to change an advance state or an evacuation state of the movable member to the air passage.

In the above jet engine, the combustor may have a flame stabilizer. The position of the movable member may overlap a position of the flame stabilizer, viewing in a direction of the air flow through the air passage.

The flying object in some embodiments has the jet engine shown in any one of the above-mentioned paragraphs.

In an operation method of a jet engine in some embodiments, the jet engine has an inlet configured to introduce air; and a combustor having a fuel injection port from which a fuel is injected and configured to combust the fuel injected from the fuel injection port by using the air. The combustor has a separation section defining an air passage through which the air flows, between a rear end of the inlet and the fuel injection port. A plurality of turbulent flow generating sections are arranged in the separation section to make an air flow turbulent. The operation method of the jet engine includes combusting the fuel injected from the fuel injection port by using the air while making the air flow on the wall surface of the separation section turbulent by the plurality of turbulent flow generating sections; disappearing or moving at least a part of a member that configures each of the plurality of turbulent flow generating sections; and combusting the fuel injected from the fuel injection port by using the air while restraining turbulence of the air flow on the wall surface of the separation section.

According to the present invention, it is possible to provide a jet engine in which it can be prevented without remodeling a fuselage largely that a high-pressure region reaches an inlet so that a thrust of the jet engine declines, a flying object and an operation method of the jet engine.

DESCRIPTION OF THE EMBODIMENTS

Hereinafter, a jet engine according to an embodiment will be described with reference to the attached drawings. In this case, an example in which the jet engine is applied to the flying object will be described.

(Definition of Direction)

Regarding a flow of air introduced to the jet engine from an inlet, the inlet side of the jet engine is defined as "an upstream side" or "a forward side". Also, regarding the flow of air introduced to the jet engine from the inlet, a nozzle side of the jet engine is defined as "a downstream side" or "a rear side". Also, when it is supposed that the jet engine is in the horizontal state, a direction orthogonal to the longitudinal direction of the combustor and orthogonal to the vertical direction is defined as "a span direction".

(Overview of Configuration of Flying Object)

Figure 3:
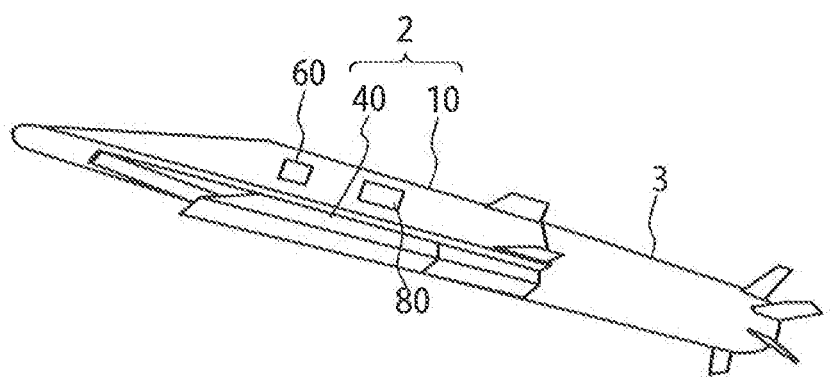
FIG. 3 is a perspective view showing a configuration example of a flying object according to an embodiment.

The configuration of a flying object 1 according to an embodiment will be described. FIG. 3 is a perspective view showing a configuration example of the flying object 1 according to the embodiment. The flying object 1 includes the jet engine 2 and a rocket motor 3. When the flying object 1 is launched from a launcher, the rocket motor 3 accelerates the flying object 1 from an initial speed at the flight start to a desired speed. Here, the initial speed of the flying object 1 is zero when the flying object 1 is launched from the launcher in the still state. When the flying object is launched from the launcher of a moving vehicle or a flight body in movement or flight state, the initial speed is a moving speed of the moving vehicle or a flight speed of the flight body. After the flying object 1 separates the rocket motor 3, the jet engine 2 accelerates the flying object 1 more to fly for a target. The jet engine 2 has a fuselage 10 and a cowl 40. The fuselage 10 and the cowl 40 configure an inlet, a combustor and a nozzle of the jet engine 2, to be mentioned later. The jet engine 2 introduces an air from the inlet; mixes the air and a fuel and combusts the mixture in the combustor; expands a combustion gas in the nozzle and expels the expanded gas from the nozzle to a rear direction. Thus, the jet engine 2 acquires a thrust. The flying object 1 may have a sensor 60 and/or a control device 80.

(Overview of Configuration of Jet Engine)

Figure 4A:
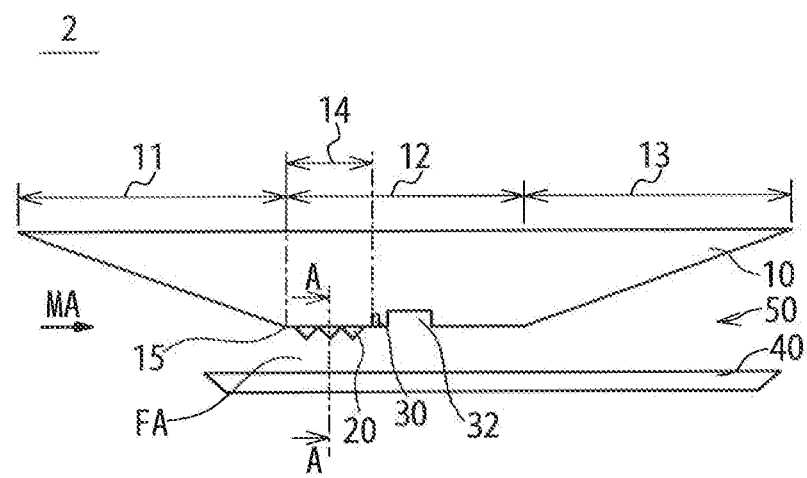
FIG. 4A is a cross sectional view schematically showing a configuration example of the jet engine according to an embodiment.
Figure 4B:
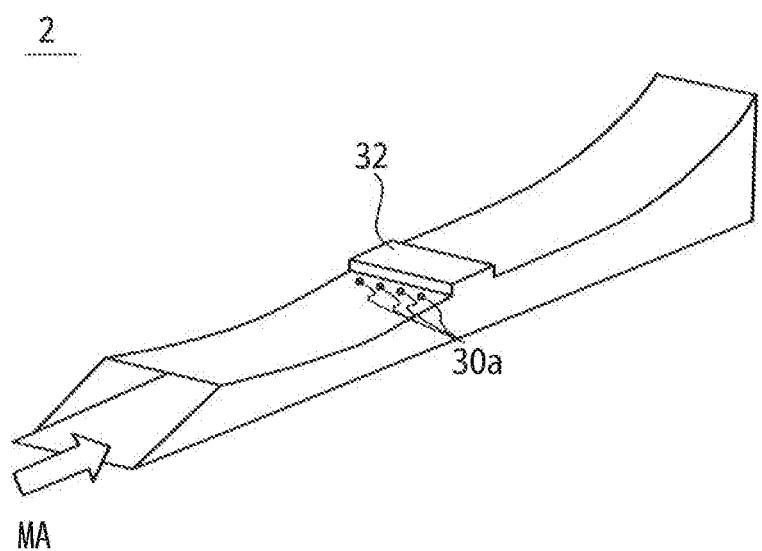
FIG. 4B is a perspective view schematically showing a configuration example of the jet engine according to the embodiment.
Figure 4C:
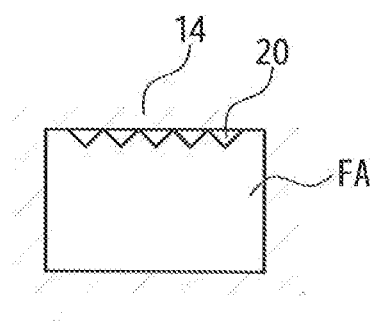
FIG. 4C is an A-A cross sectional view of FIG. 4A.

Next, the jet engine according to the embodiment will be described with reference to FIG. 4A to FIG. 4D. FIG. 4A and FIG. 4C are cross sectional views (longitudinal cross sectional views) schematically showing a configuration example of the jet engine according to the embodiment. FIG. 4B is a perspective view schematically showing a configuration example of the jet engine according to the embodiment. Also, FIG. 4C is an A-A cross sectional view of FIG. 4A.

The jet engine 2 has the fuselage 10 and the cowl 40 which is provided below the fuselage 10 to form a space 50 through which gas can flow. A lower part of a forward part of the fuselage 10 and a forward part of the cowl 40 configure the inlet 11 to introduce an air into the space 50. A lower part of the middle of the fuselage 10 and a middle part of the cowl 40 configure the combustor 12 to mix a fuel and an air and to combust the mixture. A lower part of the rear part of the fuselage 10 and a rear part of the cowl 40 configure the nozzle 13 to expand and expel a combustion gas.

Alternatively, for example, the jet engine 2 is configured from a cylindrical shape member such as a circular cylindrical member. The cylindrical shape member (the jet engine 2) may be installed in a lower portion of the fuselage 10. In this case, the forward part of the cylindrical shape member configures the inlet 11. The middle part of the cylindrical shape member configures the combustor 12. The rear part of the cylindrical shape member configures the nozzle 13.

(Overview of Configuration of Combustor)

The combustor 12 has a fuel injector 30 and a flame stabilizer 32. The fuel injector 30 is arranged on the upstream side than the flame stabilizer 32. In other words, the fuel injector 30 is arranged between the flame stabilizer 32 and the rear end 15 of the inlet (for example, the position where the decrease of the cross section of the air passage ends, viewing in a direction of air flow in the jet engine). Alternatively, the fuel injector 30 may be arranged in the wall section of the flame stabilizer 32. For example, the fuel injector 30 has a plurality of fuel injection ports 30a. The plurality of fuel injection ports 30a are arranged in one line or plural lines along the direction orthogonal to the longitudinal direction of the combustor 12 (the span direction in FIG. 4A and FIG. 4B, and a circumferential direction when adopting a circular combustor having a cross section of a circle).

For example, the flame stabilizer 32 is arranged on the downstream side than the fuel injector 30. A mixture gas of the mainstream air MA and the fuel injected from the fuel injector 30 is supplied to the flame stabilizer 32. The mixture gas moves in a low speed in the flame stabilizer 32. The flame stabilizer 32 maintains the flame for the combustion of the fuel injected from the fuel injector 30. For example, the flame stabilizer 32 is a concave section (a shallow concave section) provided for the wall section of the combustor 12. The concave section may be formed over the whole span direction of the combustor 12. Alternatively, the concave section may be formed only over a part of the span direction of the combustor 12. In the example shown in FIG. 4A and FIG. 4B, the cross section shape of the concave section (a cross section shape along a plane perpendicular to the span direction) is a rectangular shape. Alternatively, a cross section shape of the concave section may be a shape except for the rectangular shape.

The combustor 12 has a separation section 14 that defines an air passage FA through which the air introduced from the inlet 11 flows, between the rear end 15 of the inlet and the fuel injector 30 (e.g. the fuel injection port 30a).

Figure 1A:
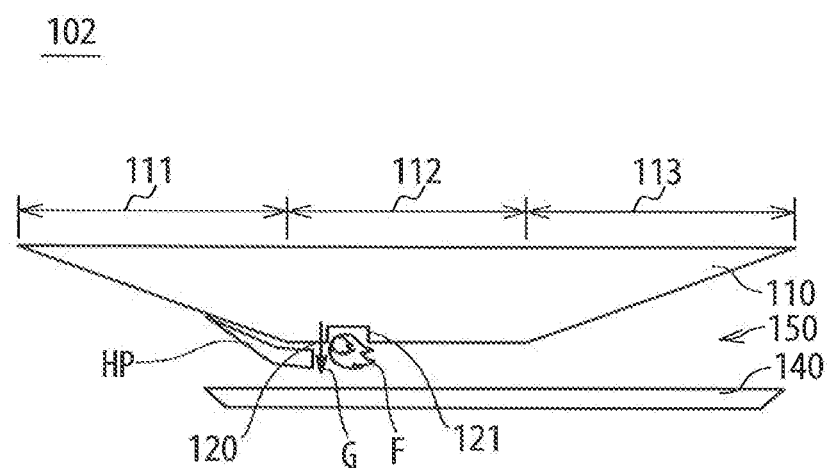
FIG. 1A is a cross sectional view schematically showing a configuration example of a jet engine.
Figure 1B:
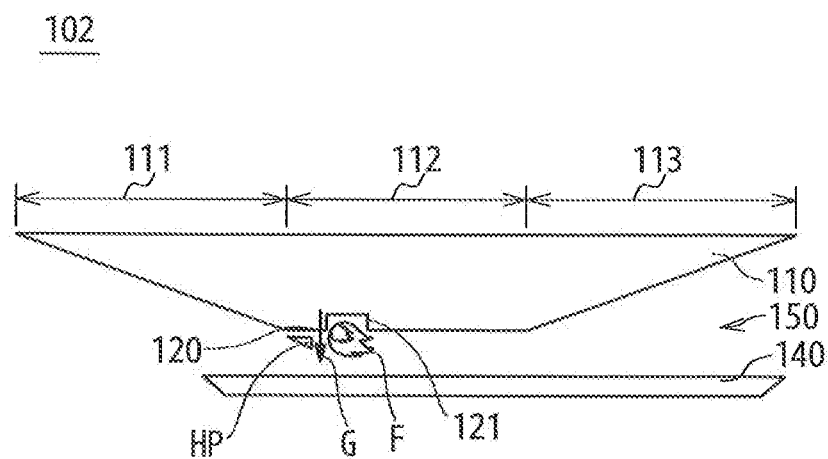
FIG. 1B is a cross sectional view schematically showing another configuration example of the jet engine.

The A-A cross sectional view of FIG. 4A is shown in FIG. 4C. Referring to FIG. 4C, it could be understood that the air passage FA is defined by the separation section 14. Also, referring to FIG. 4A and FIG. 4C, it could be seen that a plurality of turbulent flow generating sections 20 are provided in the separation section 14 to generate a turbulent flow of air in the air passage FA (more specifically, a flow of air through the boundary layer on the wall surface of the separation section 14). Note that each of the plurality of turbulent flow generating sections 20 contains a prominence which protrudes from the wall surface of the separation section 14 in the example shown in FIG. 4A and FIG. 4C. When the flow of air through the boundary layer on the wall surface of the separation section 14 is changed to the turbulent flow by the plurality of turbulent flow generating sections 20, the decrease of momentum in the boundary layer is restrained. When the decrease of momentum in the boundary layer is restrained, it becomes difficult for a flow speed in a flow field in the boundary layer to decrease so that the delamination of the boundary layer from the wall surface of the separation section 14 is restrained. When the delamination of the boundary layer from the wall surface of the separation section 14 is restrained, the expansion of a high-pressure region which is caused by the delamination of the boundary layer is restrained. As a result, even if the flight speed of the flying object is slow (at an acceleration step of the flying object in almost case), the high-pressure region HP is prevented from reaching the inlet 11, like an example shown in FIG. 1A.

Note that it is difficult for the boundary layer on the wall surface of the separation section 14 to be delaminated from the wall surface when the flight speed of the flying object is fast (mainly, at a cruising step of the flying object). In addition, the pressure loss caused by the turbulence of air flow (the pressure loss of the air that flows through the air passage FA) is large when the flight speed of the flying object is fast. Therefore, when the flight speed of the flying object is fast (mainly, at the cruising step of the flying object), it is desirable to restrain the turbulence of air flow by the turbulent flow generating sections 20. Thus, in the embodiment, each of the plurality of turbulent flow generating sections 20 contains a member by which the turbulence of air flow can be restrained through movement or disappearance. The member contains a material that automatically disappears from the wall surface of the separation section 14 due to, for example, thermal influence (aerodynamic heating and so on) or aerodynamic influence (aerodynamic shear force and so on) in the flight.

Figure 4D:
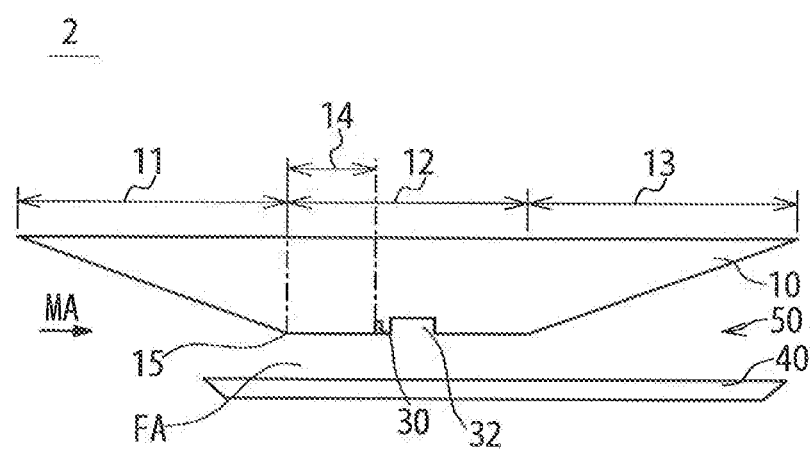
FIG. 4D is a cross sectional view schematically showing a configuration example of the jet engine according to the embodiment.

FIG. 4D is a diagram showing a state that the turbulent flow generating sections 20 disappear or have been moved (more specifically, a member that can restrain the turbulence of air flow due to disappearance or movement). In an example shown in FIG. 4D, the pressure loss that is caused by the turbulence of air flow is restrained by the disappearance or movement of the turbulent flow generating sections 20.

(Overview of Operation of Jet Engine)

Figure 5:
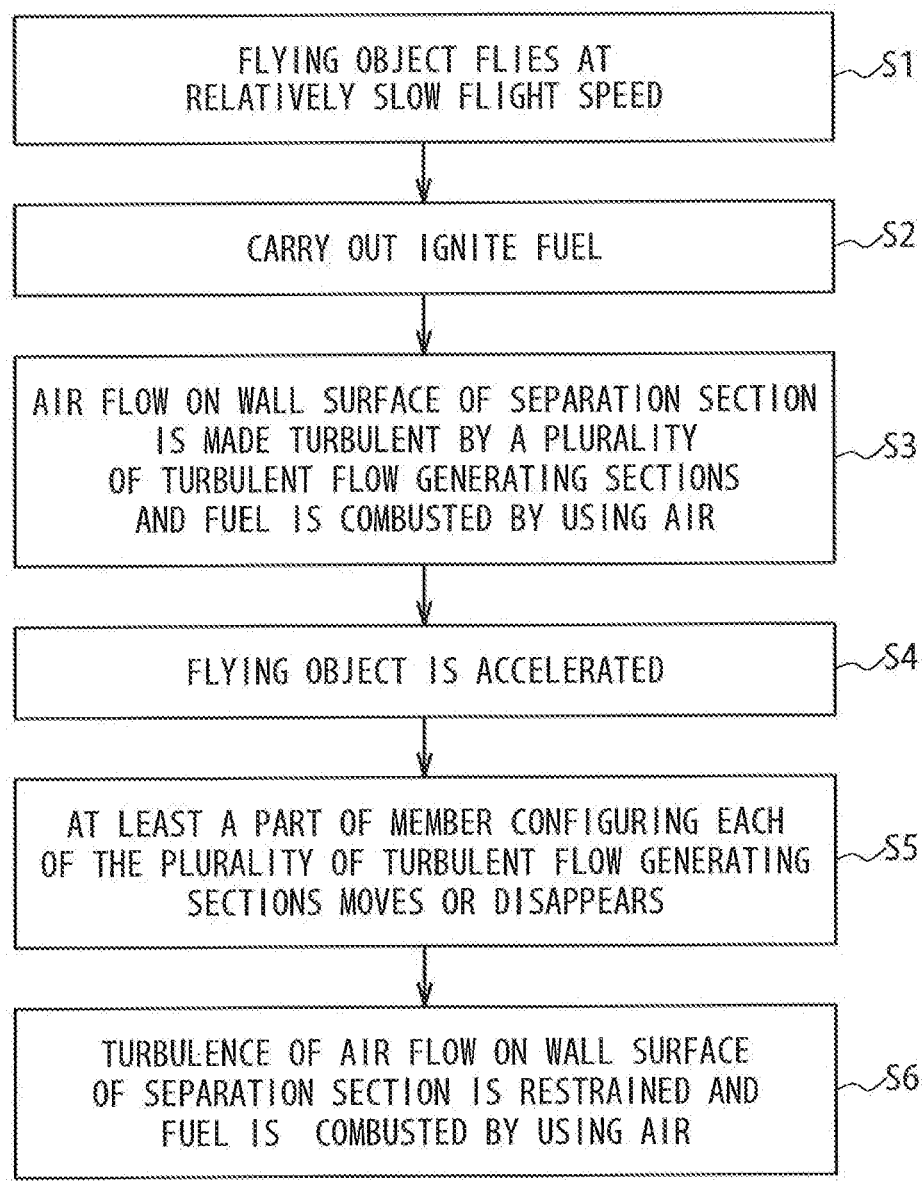
FIG. 5 is a flow chart showing an operation method of the jet engine.
Figure 6A:
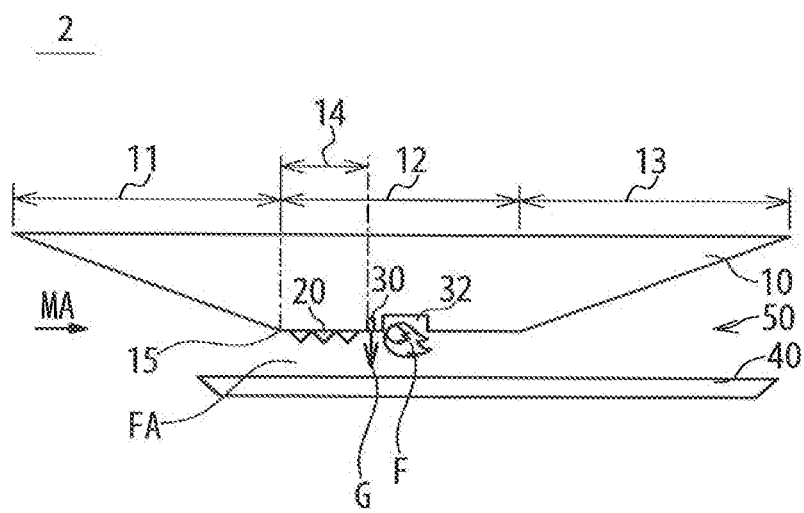
FIG. 6A is a cross sectional view showing the operating state of the jet engine when the flight speed of the flying object is relatively slow.
Figure 6B:
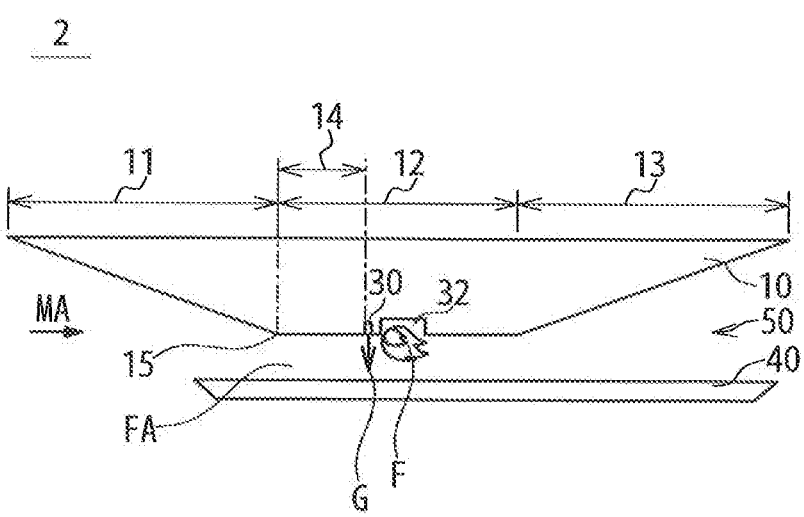
FIG. 6B is a cross sectional view showing the operating state of the jet engine when the flight speed of the flying object is relatively fast.

Referring to FIG. 5 to FIG. 6B, the operation of the jet engine will be described. FIG. 5 is a flow chart showing an operation method of the jet engine. FIG. 6A is a cross sectional view schematically showing the operating state of the jet engine when the flight speed of a flying object is relatively slow. FIG. 6B is a cross sectional view schematically showing the operating state of the jet engine when the flight speed of the flying object is relatively fast.

At first step S1, the flying object 1 flies in a relatively slow speed. The flight of the flying object 1 may be executed by the operation of the rocket motor 3 or by the flying object 1 loaded in another flight body in flight.

At second step S2, the ignition to the fuel G injected from the fuel injector 30 is carried out. For example, the ignition to the fuel is carried out by an igniter (not shown).

At third step S3, the flow of air on the wall surface of the separation section 14 of the air introduced from the inlet 11 is made turbulent by the plurality of turbulent flow generating sections 20. Also, the fuel injected from the fuel injector 30 is combusted by using the air introduced from the inlet 11. The flame F generated through the combustion is maintained by the flame stabilizer 32. The combustion gas generated through the combustion of fuel is expelled from the jet engine through the nozzle 13 and the jet engine acquires a thrust. FIG. 6A shows the operating state of the jet engine when the third step S3 is executed. In an example shown in FIG. 6A, the flow of air on the wall surface of the separation section 14 is made turbulent by the plurality of turbulent flow generating sections 20. Therefore, it is restrained that a high-pressure region expands to the front side (the inlet side) due to the boundary layer delamination.

At fourth step S4, the flying object 1 is accelerated. At fifth step S5, at least a part of the member of each of the plurality of turbulent flow generating sections 20 disappears or moves. For example, all of the turbulent flow generating sections 20 may disappear.

At sixth step S6, the turbulence of the air flow on the wall surface of the separation section 14 is restrained since at least a part of the member of each of the plurality of turbulent flow generating sections 20 disappears or moves. Also, the fuel injected from the fuel injector 30 is combusted by using the air introduced from the inlet 11. The flame F generated through the combustion is maintained by the flame stabilizer 32. The combustion gas generated through the combustion of fuel is expelled from the jet engine through the nozzle 13 and the jet engine acquires a thrust. FIG. 6B shows the operating state of the jet engine when the sixth step S6 is executed. In an example shown in FIG. 6B, the turbulence of the air flow on the wall surface of the separation section 14 is restrained. Therefore, the pressure loss is reduced and the fuel efficiency of the flying object improves. Note that the flight speed (flight Mach number) of the flying object 1 at the sixth step S6 is larger than the flight speed (flight Mach number) of the flying object 1 at the third step S3. For example, the flight speed (flight Mach number) of the flying object 1 at the sixth step S6 is equal to or higher than a first threshold value TH1 (e.g. Mach 2, Mach 2.5, Mach 3 and so on). The flight speed (flight Mach number) of the flying object 1 at the third step S3 is smaller than the first threshold value TH1 (e.g. Mach 2, Mach 2.5, Mach 3 and so on).

Figure 2A:
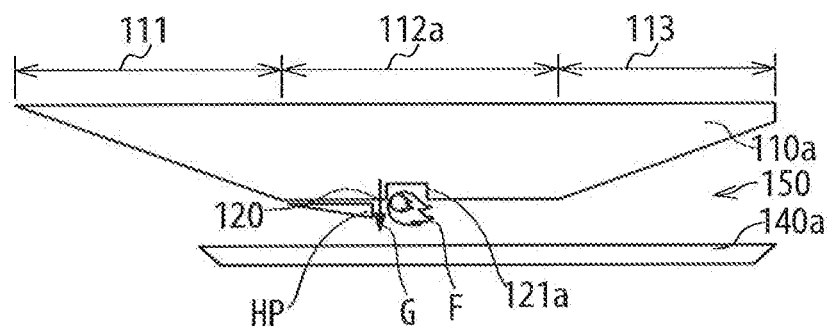
FIG. 2A is a cross sectional view schematically showing a configuration example of the jet engine to which a settlement method is applied.
Figure 2B:
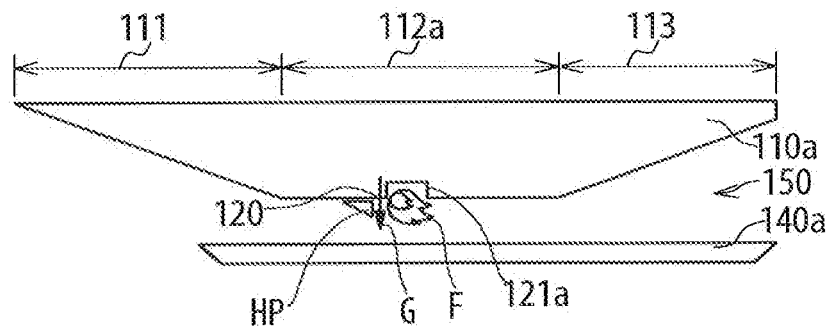
FIG. 2B is a cross sectional view schematically showing another configuration example of the jet engine to which another settlement is applied.

In the above-mentioned embodiment, the delamination of the boundary layer from the wall surface of the separation section 14 is restrained at the time of the low-speed flight. As a result, the propagation of the combustion pressure to the upstream side is restrained. Since the propagation of the combustion pressure to the upstream side is restrained, the jet engine becomes possible to operate at the low speed. That is, the operable speed range of the jet engine expands. Also, when the jet engine in the embodiment is applied to the flying object that is accelerated by a rocket motor before the jet engine operates, a necessary quantity of rocket motors is reduced. As a result, the whole flying object can be dwarfed and be lightened. Moreover, when at least a part of the members of each of plurality of turbulent flow generating sections 20 disappears automatically due to thermal influence or aerodynamic influence in flight, it becomes possible to automatically change the state of turbulent flow generating sections 20 without using an actuator or a control device. Also, in the above-mentioned embodiment, the turbulence of air flow with the pressure loss is restrained in case of the high-speed flight (e.g. at a cruise time). Also, in the above-mentioned embodiment, by providing the plurality of turbulent flow generating sections 20, it becomes unnecessary to make the length of the separation section long, unlike an example shown in FIG. 2A. As a result, upsizing of the jet engine (or, the upsizing of the flying object) is restrained.

(Arrangement, Structure, Material and so on of Turbulent Flow Generating Section)

Figure 7A:
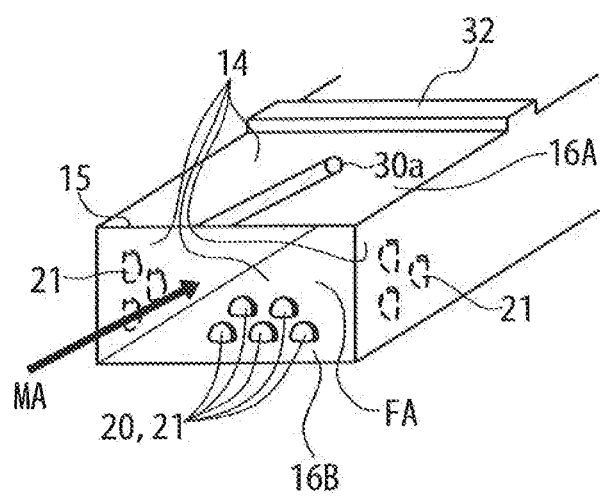
FIG. 7A is a perspective view schematically showing a partial configuration example of the jet engine according to the embodiment.
Figure 7B:
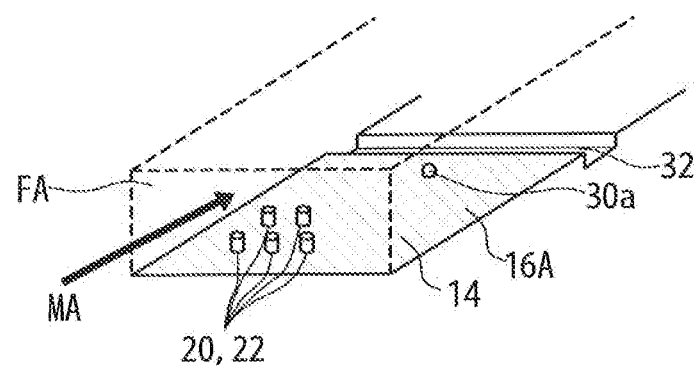
FIG. 7B is a perspective view schematically showing another partial configuration example of the jet engine according to the embodiment.
Figure 7C:
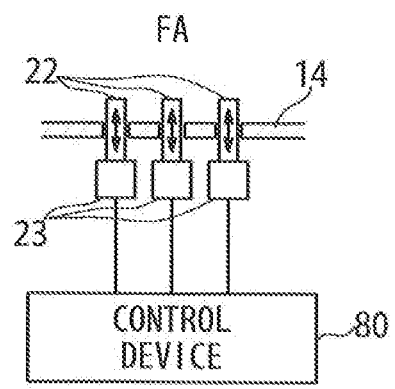
FIG. 7C is a cross sectional view schematically showing the state of the separation section on the surface perpendicular to the flow of mainstream air when the flight speed of the flying object is relatively slow.
Figure 7D:
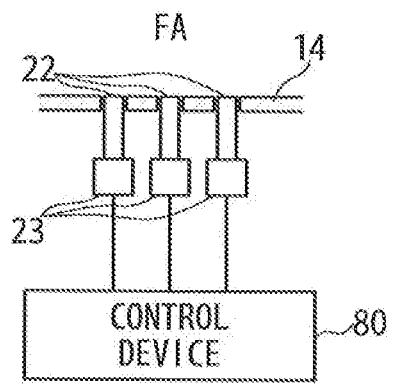
FIG. 7D is a cross sectional view schematically showing the state of the separation section on the surface perpendicular to the flow of mainstream air when the flight speed of the flying object is relatively fast.
Figure 7E:
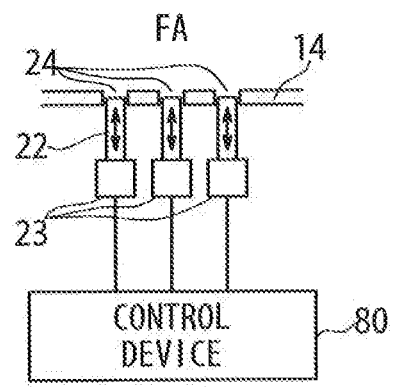
FIG. 7E is a cross sectional view schematically showing the state of the separation section on the surface perpendicular to the flow of mainstream air when the flight speed of the flying object is relatively slow.
Figure 7F:
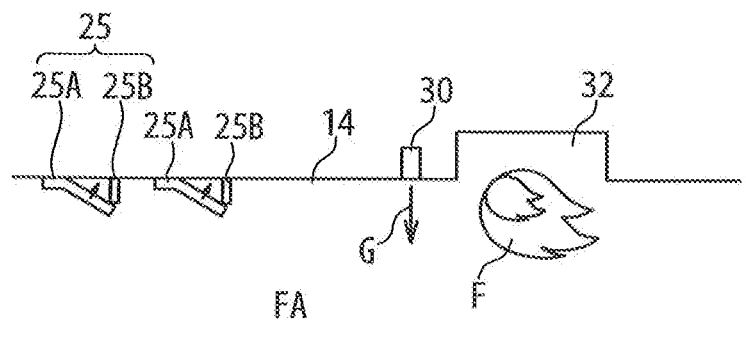
FIG. 7F is a cross sectional view schematically showing the state of the separation section when the flight speed of the flying object is relatively slow.
Figure 7G:
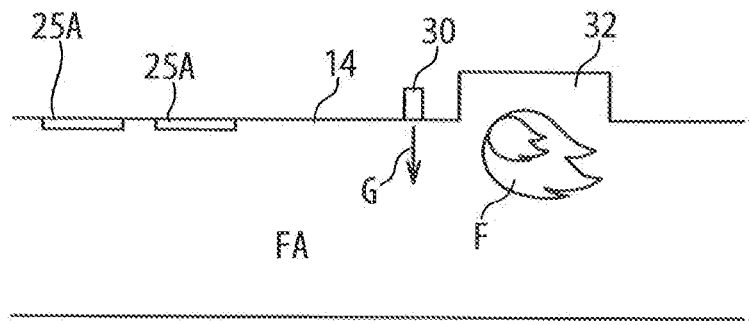
FIG. 7G is a cross sectional view schematically showing the state of the separation section when the flight speed of the flying object is relatively fast.

Referring to FIG. 7A to FIG. 7G, a specific example of the arrangement, structure, material and so on of the turbulent flow generating section will be described. FIG. 7A and FIG. 7B are perspective views schematically showing a partial configuration of the jet engine according to the embodiment. FIG. 7C to FIG. 7E are cross-sectional views schematically showing the state of the separation section along a surface perpendicular to a flow of mainstream air. FIG. 7F and FIG. 7G are longitudinal cross sectional views schematically showing the state of the separation section.

First Example

FIG. 7A shows an example of arrangement and structure of the turbulent flow generating sections 20. In a first example, each of plurality of turbulent flow generating sections 20 contains a member 21 that can restrain the turbulence of the air flow in the air passage FA by disappearance of the turbulent flow generating sections. More specifically, the member 21 contains a material that disappears from the wall surface of the separation section 14 by the thermal influence (aerodynamic heating and so on) or the aerodynamic influence (aerodynamic shear force and so on) in flight. The disappearing material is a material, the shape of which changes by dissolving, sublimating, combusting, delaminating and cutting down, or a combination of some of them. For example, the disappearing material is an ablation material. For example, the ablation material is sky hello (registered trademark), silica/phenol and so on. Sky hello (registered trademark) is thermal insulation paint material of epoxy-polyamide system which is commercially available from Nihon Tokushu Toryo Co., Ltd. Also, silica/phenol is a phenol resin which contains silica fiber. The material (e.g. ablation material) is configured to protrude from the wall surface of the separation section 14 toward the air passage FA at the above-mentioned third step S3. On the other hand, at least a part of the material (e.g. ablation material) disappears from the wall surface of the separation section 14 at the above-mentioned sixth step S6. As a result, the turbulence of the air flow on the wall surface of the separation section 14 is restrained.

Referring to FIG. 7A, the member 21 contains prominences which protrude for the air passage FA from the wall surface of the separation section 14. For example, the height from the wall surface of the separation section 14 to the prominent top section is from 0.5 mm to 5.0 mm. Note that it is desirable that the position of member 21 on the wall surface of the separation section 14 does not overlap the position of fuel injection port 30a (the position on the wall surface) when viewing in a direction of the air flow through the air passage FA (in other words, viewing in a longitudinal direction of the air passage FA), when the member 21 contains a material which disappears from the wall surface of the separation section 14. That is, it is desirable that the member 21 (turbulent flow generating section 20) is not arranged in a region (a region shown by slanted lines in FIG. 7A) that overlaps the position of the fuel injection port 30a (the position on the wall surface) when viewing in a direction of an air flow through the air passage FA. Since the member 21 is not arranged in the position shown by the slanted lines in FIG. 7A, the situation can be prevented in which the material of the member 21 disappearing from the wall surface reaches the fuel injection port 30a according to the air flow to cover the fuel injection port 30a.

Alternatively or additionally, when the member 21 contains the material disappearing from the wall surface of the separation section 14, it is desirable that the position of the member 21 on the wall surface of the separation section 14 does not overlap the position of the flame stabilizer 32, viewing in a direction of the air flow through the air passage FA. That is, it is desirable that the member 21 (turbulent flow generating section 20) is not arranged in a region that overlaps the position of flame stabilizer 32, viewing in a direction of the air flow through the air passage FA. By adopting the above-mentioned position relation, the situation of can be prevented in which the material of the member 21 disappearing from the wall surface reaches the flame stabilizer 32 according to the air flow to degrade the flame maintaining function of the flame stabilizer 32.

In an example shown in FIG. 7A, the wall surface 16A where the fuel injection port 30a (for example, the upper wall surface or lower wall surface of the combustor) is arranged is different from the wall surface 16B where the member 21 (the turbulent flow generating section 20) is arranged. That is, the wall surface 16A where the fuel injection port 30a is arranged is not the same surface as the wall surface 16B where the member 21 (the turbulent flow generating section 20) is arranged. Therefore, a possibility that the material of the member 21 disappearing from the wall surface 16B reaches the fuel injection port 30a according to the air flow is reduced. Note that in an example shown in FIG. 7A, the wall surface 16B where the member 21 (the turbulent flow generating section 20) is arranged is opposite to the wall surface 16A where the fuel injection port 30a is arranged. Alternatively or additionally, the wall surface 16B where the member 21 (the turbulent flow generating section 20) is arranged may be a side wall surface of the combustor (reference to the member 21 shown by the broken lines in FIG. 7A).

Note that the construction of the member 21 to the wall surface of the separation section 14 may be carried out by applying or spraying the material of the member 21 on the wall surface of the separation section 14. Alternatively, the construction of the member 21 on the wall surface of the separation section 14 may be carried out by the member 21 adhering on the wall surface of the separation section 14.

Second Example

FIG. 7B to FIG. 7D show another example of the arrangement and structure of the turbulent flow generating section 20. FIG. 7B and FIG. 7C show a state of the separation section 14 at the above-mentioned third step S3. FIG. 7D shows a state of the separation section at the above-mentioned sixth step S6. In a second example, each of the plurality of turbulent flow generating sections 20 contains a member 22 which can restrain the turbulence of the air flow in the air passage FA by moving. As shown in FIG. 7C, the member 22 is mechanically connected with a drive device 23. The member 22 is moved by the operation of the drive device 23 (e.g. an actuator). Note that, when the member 22 is a magnetic substance, the drive device 23 may contain an electromagnet to move the member 22 by the magnetic force. In an example shown in FIG. 7B, the member 22 is a columnar member but may be any shape, if the member 22 has a prominence protruding for the air passage FA. The drive device 23 operates when receiving a control signal from a control device 80. In an example shown in FIG. 7C and FIG. 7D, the drive device 23 operates when receiving the control signal from the control device 80 and evacuates the member 22 from the air passage FA. That is, by the operation of the drive device 23, the member 22 moves from the position protruding from the wall surface of the separation section 14 for the air passage FA to an evaluating position not protruding from the wall surface of the separation section 14. Note that in an example shown in FIG. 7C and FIG. 7D, one drive device 23 is configured to drive a corresponding member 22, but alternatively the one drive device 23 may be configured to drive a plurality of members 22.

FIG. 7C shows a state before the operation of the drive device 23 and FIG. 7D shows a state after the operation of the drive device 23. In the state shown in FIG. 7C, the member 22 protrudes for the air passage FA from the wall surface of the separation section 14. For this reason, the air flow on the wall surface of the separation section 14 is made turbulent by the members 22 (turbulent flow generating sections 20). Note that in the state shown in FIG. 7C, for example, the height from the wall surface of the separation section 14 to the top section of the member 22 is from 0.5 mm to 5.0 mm. On the other hand, in the state shown in FIG. 7D, the member 22 is evacuated into the wall of the separation section 14. The member 22 may evacuate into the wall of the separation section 14 so that the top section of the member 22 becomes flush with the wall surface of the separation section 14.

The control device 80 may control the drive device 23 to operate based on at least one of flight Mach number, flight height and flight time. The flight Mach number and/or the flight height may be calculated by the control device 80 based on the data acquired by the sensor 60. The flight time may be measured by a timer of the control device 80. The control device 80 may control the drive device 23 to operate, for example, when the flight Mach number becomes equal to or more than the first threshold value TH1. By the operation of the drive device 23, the member 22 moves from the prominent position shown in FIG. 7C to the evacuation position shown in FIG. 7D.

When the member 22 contains a movable member which is movable relatively to the air passage FA (in other words, when the member 22 contains a movable member relatively to the wall surface of the separation section 14), it is desirable that the position of the movable member overlaps the position of the flame stabilizer 32, viewing in a direction of the air flow through the air passage FA. That is, it is desirable that viewing in the direction of the air flow through the air passage FA, at least one movable member (turbulent flow generating section 20) is arranged in a region overlapping the flame stabilizer 32 (a region shown by the slanted lines in FIG. 7B). By adopting such a position relation, the forming of a high-pressure region in the neighborhood of the movable member is restrained by the movable member (turbulent flow generating section 20). As a result, the air is smoothly supplied to the flame stabilizer 32 through the neighborhood of the movable member.

Note that in the second example, when the turbulent flow generating section 20 (the member 22) disappears so that any material is not contained that can restrain the turbulence of the air flow in the air passage FA, the bad influence due to re-adhesion of the material to the combustor can be prevented (e.g. the fuel injection port 30a, the flame stabilizer 32 and so on).

Modification Example of Second Example

Referring to FIG. 7E, a modification example of the second example is shown. FIG. 7E shows a state of the drive device 23 before its operation (that is, FIG. 7E shows a state of the separation section 14 at the above-mentioned third step S3). An example shown in FIG. 7E is different from the above-mentioned second example in a point that the member 22 is not in a position protruding for the air passage FA from the wall surface of the separation section 14 but in the evacuation position into the wall surface of the separation section 14. The modification example of the second example is same as the second example in the other points. In the example shown in FIG. 7E, since the member 22 is in the evacuation position in the wall of the separation section 14, a plurality of concave sections 24 are formed by the separation section 14 and the plurality of the members 22. The air flow on the wall surface of the separation section 14 is made turbulent by the plurality of concave sections 24.

FIG. 7D shows a state of the drive device 23 after its operation in the modification example of the second example. In the example shown in FIG. 7E and FIG. 7D, the drive device 23 operates in response to the control signal from control device 80 to move the member 22 for the air passage FA. That is, by the operation of the drive device 23, the plurality of concave sections 24 formed from the separation section 14 and the plurality of members 22 become shallow in depth or become extinct. As a result, the turbulence of the air flow on the wall surface of the separation section 14 can be restrained.

Third Example

FIG. 7F and FIG. 7G show another example of the arrangement and structure of the turbulent flow generating section 25. FIG. 7F shows a state of the separation section 14 at the above-mentioned third step S3. FIG. 7G shows a state of the separation section at the above-mentioned sixth step S6. In the third example, each of the plurality of turbulent flow generating sections 25 contains a member 25B which disappears automatically from the wall surface of the separation section 14 by a thermal influence (aerodynamic heating and so on) or an aerodynamic influence (aerodynamic shear force and so on) in the flight, and a member 25A (the movable member) which moves automatically when the member 25B disappears, to restrain the turbulence of the air flow in the air passage FA. For example, the member 25A is a board-like member. In an example shown in FIG. 7F, at least a part of the member 25A protrudes from the wall surface of the separation section 14 for the air passage FA. As a result, the air flow on the wall surface of the separation section 14 is made turbulent by the plurality of members 25A (the plurality of turbulent flow generating sections 25).

In correspondence to the above-mentioned fifth step S5, the member 25B disappears automatically from the wall surface of the separation section 14 by the thermal influence (the aerodynamic heating and so on) or the aerodynamic influence (the aerodynamic shear force and so on) in the flight. Since the member 25B supporting the member 25A in the prominent state disappears, the member 25A moves to a position along the wall surface of the separation section 14. Then, when the member 25A moves to the position along the wall surface of the separation section 14, the turbulence of the air flow on the wall surface of the separation section 14 is restrained.

When adopting the configuration shown in at least one of the above-mentioned first to third examples, the delamination of the boundary layer on the wall surface of the separation section 14 from the wall surface is restrained at the time of low-speed flight. As a result, it is restrained for a combustion pressure to propagate to an upstream side. Since it is restrained for the combustion pressure to propagate to the upstream side, the jet engine becomes operable at the low speed. That is, the operable speed range of the jet engine expands. When the jet engine having the configuration shown in at least one of the above-mentioned first to third examples is applied to the flying object that accelerates by the rocket motor before the jet engine operates, a necessary quantity of rocket motor can be reduced. As a result, the whole flying object can be dwarfed and be lightened. Moreover, when adopting the configuration shown in the above-mentioned first or third example, the state of the turbulent flow generating section can be automatically changed without using an actuator or a control device. Also, when adopting the configuration shown in at least one of the above-mentioned first to third examples, the turbulence of the air flow accompanied by a pressure loss is restrained in case of the high-speed flight (e.g. at the cruising time). Also, when adopting the configuration shown in at least one of the above-mentioned first to third examples, it becomes unnecessary to make the length of the separation section long, unlike the example shown in FIG. 2A. As a result, it is restrained to upsize the jet engine (or, to upsize the flying object).

Note that the configuration of a combination of at least two of the above-mentioned first to third examples may be adopted as a specific configuration of the plurality of turbulent flow generating sections. Alternatively, a configuration except for the configuration shown in the above-mentioned first to third examples may be adopted as a specific configuration of the plurality of turbulent flow generating sections.

The present invention is not limited to the above embodiments. It is clear that each of the embodiments may be changed or modified appropriately in the range of the technique thought of the present invention. Also, various techniques used in each embodiment or the modification example may be applied to another embodiment, unless the technical contradiction is caused.

The invention claimed is:

1. A jet engine comprising:
an inlet configured to introduce air; and
a combustor having a fuel injection port from which a fuel is injected and configured to combust the fuel injected from the fuel injection port by using the air,
wherein the combustor comprises a separation section defining an air passage through which the air flows, between a rear end of the inlet and the fuel injection port,
wherein a plurality of turbulent flow generating sections are arranged in the separation section to make an air flow in the air passage turbulent, and
wherein each of the plurality of turbulent flow generating sections comprises:
a first member configured to create turbulence in a boundary layer of the air flow on a wall surface of the separation section as it protrudes from the wall surface towards the air passage, and to lessen the turbulence in the boundary layer of the air flow by moving from a first position in which the first member protrudes from the wall surface of the separation section to a second position in which the first member lies against the wall surface of the separation section; and
a second member configured to support the first member in the first position, and further configured to disappear automatically from the wall surface of the separation section by a thermal influence or an aerodynamic influence in flight so that the first member moves automatically to the second position.

2. The jet engine according to claim 1, wherein the first member has a prominence which is prominent for the air passage.

3. The jet engine according to claim 1, wherein a position of the first member on the wall surface of the separation section does not overlap a position of the fuel injection port, viewing in a direction of the air flow through the air passage.

4. The jet engine according to claim 3, wherein the combustor comprises a first wall surface where the fuel injection port has been arranged and a second wall surface where the plurality of turbulent flow generating sections have been arranged, and
wherein the second wall surface is a wall surface that is different from the first wall surface.

5. The jet engine according to claim 1, wherein the first member is a movable member relative to the air passage.

6. The jet engine according to claim 5, wherein the combustor has a flame stabilizer, and
wherein a position of the movable member overlaps a position of the flame stabilizer, viewing in a direction of the air flow through the air passage.

7. A flying object comprising a jet engine which comprises:
an inlet configured to introduce air; and
a combustor having a fuel injection port from which a fuel is injected and configured to combust the fuel injected from the fuel injection port by using the air,
wherein the combustor comprises a separation section defining an air passage through which the air flows, between a rear end of the inlet and the fuel injection port,
wherein a plurality of turbulent flow generating sections are arranged in the separation section to make an air flow in the air passage turbulent, and
wherein each of the plurality of turbulent flow generating sections comprises:
a first member configured to create turbulence in a boundary layer of the air flow on a wall surface of the separation section as it protrudes from the wall surface towards the air passage, and to lessen the turbulence in the boundary layer of the air flow by moving from a first position in which the first member protrudes from the wall surface of the separation section to a second position in which the first member lies against the wall surface of the separation section; and
a second member configured to support the first member in the first position, and further configured to disappear automatically from the wall surface of the separation section by a thermal influence or an aerodynamic influence in flight so that the first member moves automatically to the second position.

8. An operation method of a jet engine,
wherein the jet engine comprises:
an inlet configured to introduce air; and
a combustor having a fuel injection port from which a fuel is injected and configured to combust the fuel injected from the fuel injection port by using the air,
wherein the combustor comprises a separation section defining an air passage through which the air flows, between a rear end of the inlet and the fuel injection port, and
wherein a plurality of turbulent flow generating sections are arranged in the separation section to make an air flow in the air passage turbulent,
the operation method comprising:
combusting the fuel injected from the fuel injection port by using the air while making a boundary layer of the air flow on a wall surface of the separation section turbulent by first members of the plurality of turbulent flow generating sections respectively protruding from the wall surface toward the air passage in a first stage of operation;
automatically moving the first members of the plurality of turbulent flow generating sections from a first position in which the first members are supported by second members of the plurality of turbulent flow generating sections and protrude from the wall surface of the separation section to a second position in which the first members lie against the wall surface of the separation section by an automatic disappearance of the second members due to a thermal influence or an aerodynamic influence in flight; and
combusting the fuel injected from the fuel injection port by using the air while lessening turbulence in the boundary layer of the air flow on the wall surface of the separation section in a second stage of operation.

\* \* \* \* \*